US011808088B2

(12) United States Patent
More et al.

(10) Patent No.: US 11,808,088 B2
(45) Date of Patent: Nov. 7, 2023

(54) ENHANCED DRILL BIT PROFILE FOR USE IN HDD

(71) Applicants: Mark More, West Bend, WI (US); James Wessing, Kewaskum, WI (US); Tina Giese, Theresa, WI (US); Casey Placek, Van Dyne, WI (US)

(72) Inventors: Mark More, West Bend, WI (US); James Wessing, Kewaskum, WI (US); Tina Giese, Theresa, WI (US); Casey Placek, Van Dyne, WI (US)

(73) Assignee: Kondex Corporation, Lomira, WI (US)

( * ) Notice: Subject to any disclaimer, the term of this patent is extended or adjusted under 35 U.S.C. 154(b) by 31 days.

(21) Appl. No.: 17/380,322

(22) Filed: Jul. 20, 2021

(65) Prior Publication Data
US 2022/0025713 A1 Jan. 27, 2022

Related U.S. Application Data

(60) Provisional application No. 63/054,755, filed on Jul. 21, 2020.

(51) Int. Cl.
E21B 10/55 (2006.01)
B23K 26/342 (2014.01)
B23K 101/00 (2006.01)
E21B 7/06 (2006.01)
E21B 10/43 (2006.01)
E21B 7/04 (2006.01)
B23K 103/00 (2006.01)

(52) U.S. Cl.
CPC ............ *E21B 10/55* (2013.01); *B23K 26/342* (2015.10); *E21B 7/064* (2013.01); *E21B 10/43* (2013.01); *B23K 2101/002* (2018.08); *B23K 2103/52* (2018.08); *E21B 7/046* (2013.01)

(58) Field of Classification Search
CPC .......... E21B 10/55; E21B 7/064; E21B 10/43; E21B 7/046
See application file for complete search history.

(56) References Cited

U.S. PATENT DOCUMENTS 3,871,836 A    3/1975  Polk et al.
RE29,989 E     5/1979  Polk et al.
(Continued)

FOREIGN PATENT DOCUMENTS

AU    2001288875 B2    3/2002
JP       5975697 B2    8/2016
(Continued)

OTHER PUBLICATIONS

Dictionary definitions of "braze" and "weld", accessed Oct. 13, 2022 via thefreedictionary.com.*

Primary Examiner — Blake Michener
(74) Attorney, Agent, or Firm — Reinhart Boerner Van Deuren P.C.

(57) ABSTRACT

A new horizontal directional drilling (HDD) bit comprising a bit body is provided with illustrated embodiments including a flat bit design and a cobble bit design. Cutter teeth may be cut (e.g. formed or machined) into the base steel material of the bit body. Additionally, a broken edge profile may be generated to avoid sharp corners for better receipt of hard facing material such as laser clad beads that may be applied in higher wear regions.

40 Claims, 7 Drawing Sheets

(56) References Cited

U.S. PATENT DOCUMENTS

| | | | | |
|---|---|---|---|---|
| 4,953,638 A * | 9/1990 | Dunn | ............ | E21B 47/022 |
| | | | | 175/45 |
| 5,020,608 A * | 6/1991 | Oden | ............ | E21B 7/064 |
| | | | | 175/21 |
| 5,067,262 A * | 11/1991 | Stiffler | ............ | E02F 9/2858 |
| | | | | 175/426 |
| 5,148,880 A * | 9/1992 | Lee | ............ | E21B 19/084 |
| | | | | 175/398 |
| 5,242,026 A * | 9/1993 | Deken | ............ | E21B 10/20 |
| | | | | 175/62 |
| 5,253,721 A * | 10/1993 | Lee | ............ | E21B 7/06 |
| | | | | 175/73 |
| 5,341,887 A * | 8/1994 | Deken | ............ | E21B 10/62 |
| | | | | 175/62 |
| 5,469,926 A * | 11/1995 | Lessard | ............ | E21B 7/064 |
| | | | | 175/424 |
| 5,502,905 A | 4/1996 | Cornelius et al. | | |
| 5,647,448 A * | 7/1997 | Skaggs | ............ | E21B 10/54 |
| | | | | 37/460 |
| 5,799,740 A | 9/1998 | Stephenson et al. | | |
| 6,039,127 A | 3/2000 | Myers | | |
| 6,125,950 A | 10/2000 | Osborne | | |
| 6,146,476 A * | 11/2000 | Boyer | ............ | B23P 15/28 |
| | | | | 219/121.66 |
| 6,161,636 A * | 12/2000 | Osborne | ............ | E21B 7/06 |
| | | | | 175/21 |
| 6,247,544 B1 * | 6/2001 | Beebe | ............ | E21B 7/064 |
| | | | | 175/398 |
| 6,390,087 B1 | 5/2002 | Wentworth et al. | | |
| 6,450,269 B1 | 9/2002 | Wentworth et al. | | |
| 6,588,515 B2 | 7/2003 | Wentworth et al. | | |
| 6,789,635 B2 | 9/2004 | Wentworth et al. | | |
| 6,887,586 B2 | 5/2005 | Peker et al. | | |
| D606,569 S * | 12/2009 | Ford | ............ | D15/138 |
| 9,717,176 B2 | 8/2017 | Stoffel et al. | | |
| 10,246,943 B2 * | 4/2019 | Bukach | ............ | E21B 7/046 |
| 2003/0024741 A1 | 2/2003 | Wentworth et al. | | |
| 2003/0141114 A1 * | 7/2003 | Fuller | ............ | E21B 7/064 |
| | | | | 175/327 |
| 2006/0021800 A1 | 2/2006 | Beuershausen et al. | | |
| 2010/0065337 A1 | 3/2010 | Luce et al. | | |
| 2011/0318129 A1 | 12/2011 | Piper | | |
| 2013/0099553 A1 | 4/2013 | Krauter | | |
| 2014/0130473 A1 * | 5/2014 | Augustine | ............ | C23C 24/106 |
| | | | | 56/16.7 |
| 2015/0114199 A1 | 4/2015 | Shepard et al. | | |
| 2015/0258628 A1 | 9/2015 | Flak et al. | | |
| 2016/0157423 A1 | 6/2016 | Stoffel et al. | | |
| 2020/0224499 A1 | 7/2020 | Johnson et al. | | |
| 2020/0325584 A1 | 10/2020 | Johnson et al. | | |

FOREIGN PATENT DOCUMENTS

| | | |
|---|---|---|
| WO | WO 2019/070639 A1 | 4/2019 |
| WO | WO 2020/210063 A1 | 10/2020 |

\* cited by examiner

ENHANCED DRILL BIT PROFILE FOR USE IN HDD

CROSS-REFERENCE TO RELATED PATENT APPLICATIONS

This patent application claims the benefit of U.S. Provisional Patent Application No. 63/054,755, filed Jul. 21, 2020, the entire teachings and disclosure of which are incorporated herein by reference thereto.

FIELD OF THE INVENTION

This invention generally relates to drill bits for horizontal directional drilling (HDD), and more particularly to the profiles used on such HDD drill bits to include hard face coatings and/or profile shapes.

BACKGROUND OF THE INVENTION

Within the past decade industry has recognized Horizontal Directional Drilling (also referred to as HDD) as a superior process to conventional infrastructure implementation methods. With less disruption to the dig site, HDD adheres to most of the Environmental Protection Agencies guidelines, boosting its popularity in the industry.

HDD is quickly replacing many antiquated methods, which has garnered the attention of engineers and designers who see further opportunities for improvements. Toolmakers have been continually altering and modifying designs to develop a superior earth penetrating bit. The success of a bit is gaged by several factors; the amount of feet drilled; the amount of force required to push & rotate as well as the ease of the bit to steer. Depending on the ground conditions, these HDD drill bits come in several loose categories, each with different functional features. It is these configurations and added functional features that ultimately determine the tools overall effectiveness.

The most economical drill bit on the end of HDD equipment is often referred to as a flat bit. A flat bit may be also referred to by other names such as; dirt, spoon, spade, or duckbill. A "flat" bit, as it will be referred to hereon out, is conventionally manufactured from rectangular stock with minimal machining or processing to yield a functional tool. The main bit of the flat bit embodies a bend angle favoring the leading thrust edge typically displaced by 10 degrees. This bend creates a wrist and belly which when coupled with the flat front geometry acts well to catch and ride the subsoils like a ski. When the drill string is not rotating the wrist and belly will create a predictable deflection in the bit allowing the string to deviate from a straight line. This is the principal of how the drill string is steered while underground. To dig linearly, the bit is rotated clockwise while applying pressure. The constant rotation of the bit will dis-allow the wrist and belly from displacing the bit in a predominant direction and result in the drill string boring in a straighter line.

Being the least aggressive style of boring bit, the flat bits often are utilized in loose soils, gravel, clay, and light cobble. Because it is less aggressive in its design and operation, the flat bits do most of the digging via displacement of the soil. Unlike more aggressive bits, the primary purpose of the flat bit is to steer well. With advancements in other segments of the industry, the rigs utilizing these bits are continually tasked to tackle more complicated and challenging jobs. When utilizing an antiquated bit design, the need for improvement becomes evident when investigating failure frequency and failure mode. The high-pressure push forces of the rig and high torque rotation can make these bits fail pre-maturely when utilized for aggressive boring.

One such way the industry has avoided these failures is to utilize a more aggressive HDD bit, typically a cobble bit. These bits are designed in such a way to allow for traditionally more thrust and torque. Instead of a rectangular profile, the body and front cutting profile of the bit are typically cylindrically shaped. The cylindrical form will increase frontal surface area, which will require more force to thrust, but because the shape is contoured around a cylindrical body, it will take less force to rotate and displace the leading-edge substrate material. The round body and symmetry typically associated to a cylindrical bit decreases the steer-ability so exaggerated wrist and belly designs are incorporated. These features typically yield a bit that is less steer-able than a flat bit, but also more robust. These types of bits are not as economical as a flat bit but are often the choice of professionals when faced with varying substrate conditions where a premature failure would incur substantial lost time and cost.

Cobble bits are ideal for substrates that are composed of hard compacted soils with portions of rock (cobble). The more substantial leading edge of the bit along with its more robust torque transfer coupling lends itself better to cutting and fracturing of solid rocks if the job requires. The versatility of the cobble bit to drill through various substrates yet still steer effectively makes it one of the most widely used styles in the industry.

The most aggressive bit utilized for the most difficult jobs is a rock bit/mud motor. This specialized equipment uses the drilling fluid to rotate a secondary cutting system comprised of several rotary cutting bits. These cutting bits are conventionally conical and can range in number depending on the size of the bit. The primary method of boring for this style of bit is via fracturing of the substrate and hydro excavating the spoils. This method of boring can typically cut through any obstacles underground, giving it a distinct advantage over less aggressive styles of bit. This is only an advantage when no other option is available for it takes substantial amounts of time to cut away and flush out a boulder verses simply steering around it. With the design of the rock bits being symmetrical, and for cutting only, the ability to steer the system is reduced dramatically. Along with the steering being compromised, the cost of the system is also much greater than the cobble and flat bit systems. A rock bit and the system required to run it can cost magnitudes more than a generic flat bit. The decision to use a rock bit can be very difficult if not all the factors of the bore are fully understood.

In summary, the three main types of boring bits are flat bits, cobble bits, and rock bits. Flat bits are superior at steering, and excavating via displacement making them the best candidate for loose subsoils and light cobble. Cobble bits excel at striking a balance between displacement excavating and steering, while being able to cut through softer rock formations. These bits are best suited for larger cobble, and very hard compacted subsoils. The cost of a cobble bit will be greater than a flat bit, within the range of 2-5 times the cost. If the drilling operation requires a rock bit, the cost can exceed 10 times that of a flat bit. Because of the different performance expectations coupled with their cost, the produced volume of each style will vary within the industry. Flat bits and cobble bits are the most prevalent style of HDD bits, with the most costly rock bit holding a smaller fraction of the market. The invention described will most adequately be adapted to flat bits, but with some features being applicable to other HDD bits.

Some of the functional attributes that have been added to HDD bits since the inception of the industry include but are not limited to; carbide buttons, carbide banks, hard face welding, laser cladding, steel inserts, heat treatments, and modular assembly inserts. For example, the present Assignee has the PCT publication WO2019/070639A1 entitled "Boring bit or other bit with hard face wear resistance material" demonstrating generally these concepts in a flat bit and in a cobble bit. The intent of the additions vary but generally are included in a design to help with durability or steerability. The combination of these features has shown positive results including hard face techniques being used in conjunction with carbide banks/buttons or inserts.

Currently there are different flat bit geometries for sale in the market, each with a slightly different purpose. The geometries can be classified in roughly three different classes; square front, round front, and tapered front. Each configuration acts differently while digging, which can create a preference depending on the substrate and operator.

A square front flat bit will provide the drill string with exceptional steering, but at the cost of requiring the most push force. If this is executed in a hard subsoil, there is a risk of breaking the bit, coupling joint, or a portion of the drill string.

To reduce the amount of push force, a rounded front can be prescribed for the flat bit body. This round front thrust face will require less push force due to the thrust surface area being reduced. The reduced frontal area will create a locally higher pressure force for penetrating and working its way between obstructions. The reduction in frontal surface area is not all beneficial, as the main steering force is also reduced. In hard conditions this will tend to make the drill bit harder to control.

If the bit requires even greater penetration ability, a tapered front profile can be prescribed. A tapered front flat bit will have the highest forces at the leading edge giving it the best chance at finding a void between cobble or penetrating into a hard compacted subsoil.

BRIEF SUMMARY OF THE INVENTION

A hybrid profile is disclosed for embodiment of the invention which will retain the steering characteristics of a square front flat bit, yet embody the penetrating ability while reducing the load of a tapered bit. Additional features that have been used in the industry for advancements may be contained within embodiments.

A new hard facing technique is also disclosed that can be used with the hybrid profile and/or may be used independently including in other types of HDD bits.

Building upon the prior knowledge disclosed above, embodiments herein constitute a novel profile applied to a boring bit for use in the Horizontal Directional Drilling industry. The profile is designed in such a way to incorporate the most beneficial features of the variety of flat bits available. Some of these features include; the ease of the bit to penetrate the substrate, the steer-ability of the bit, and the longevity or wear resistance of the bit.

An inventive aspect relates to an HDD bit profile and in particular the leading-edge geometry. The new leading edge geometry encompasses a machined tooth profile at the leading edge, which is the first point of contact when drilling. Machined teeth can serve as force concentration points to help penetrate the soils while providing an increased surface area to aid in steering.

If this new profile were used with conventional fabrication methods the machined teeth may wear off rapidly due to the high-pressure forces directed onto them. To help mitigate this pre-mature failure and allow the bit to work longer, hard facing can be used.

Another aspect that may be used together with a machined tooth profile (or can be used without a machined tooth profile) is that a HDD bit profile may incorporate a broken edge(s) (preferably a chamfer) preferably around the entire perimeter followed by a hard face coating. The hard face coating is applied for wear resistance and is preferably applied via laser cladding, which creates an additive process of an additional layer of hardened material upon the steel base material.

The coating is applied preferably to the entirety of the chamfer, thus ensuring the longevity of the stress concentration reduction feature. These features can be added and subtracted with varying magnitudes around the entire periphery of the drill bit to yield a long lasting, effective, and economical drilling solution.

According to an aspect, an apparatus for boring holes, comprises: a horizontal directional drilling (HDD) bit comprising a bit body of a metal material. The bit body includes a mounting region defining at least one mounting aperture, and an engaging region extending forwardly from the mounting region. The engaging region is fixed relative to the mounting region with the horizontal directional drilling (HDD) bit including a cutting face along the engaging region. At least one cutter tooth of the metal material is integrally formed into the engaging region providing a toothed profile to the cutting face.

According to another aspect, an apparatus for boring holes, comprises a horizontal directional drilling (HDD) bit comprising a bit body of a metal material, with the bit body including a mounting region defining at least one mounting aperture, and an engaging region extending forwardly from the mounting region. The engaging region is fixed relative to the mounting region, with the horizontal directional drilling (HDD) bit including a cutting face along the engaging region, and with the bit body comprising opposed first and second side faces and a peripheral border edge extending transversely between the opposed first and second side faces. The apparatus also comprises a hard face coating that comprises a hard face material harder than the metal material of the bit body providing for increased wear resistance. Further, the peripheral border edge is joined to at least one of the first and second side faces through at least one broken corner edge defined in the bit body, with the hard face coating covering the at least one broken corner edge.

Several additional features in the following paragraphs may be provided and/or may be used in conjunction with any of the aspects described above and/or in combination with other features below.

The hard face coating may at least partially cover at least one cutter tooth, with the hard face coating being of a hard face material harder than the metal material of the bit body providing increased wear resistance.

The bit body can comprise opposed first and second side faces and a peripheral border edge extending transversely between the opposed first and second side faces, with the peripheral border edge being joined to at least one of the first and second side faces through at least one broken corner edge that extends over at least one cutter tooth and defined in the bit body. The hard face coating may cover the at least one broken corner edge to form at least part of the cutting face.

The hard face coating preferably comprises laser cladding deposited upon and integrally bonded into the metal material of the bit body. The laser cladding can be applied to the at least one broken corner edge and can at least partially cover adjacent regions on opposed sides of the at least one broken corner edge.

Preferably top and bottom side surfaces of the bit body include a cladded region (preferably with laser cladding) and a free region that is free of cladding (for example free of laser cladding of cladded region) to provide exposed surface of the metal material of the bit body in regions spaced from the at least one broken corner edge.

Preferably, the free region is larger in area than the cladded region, and preferably larger in area by at least twice and more preferably at least three times as large in area. As such, targeted wear regions may be subject to hard face coating of the cladded region.

The bit body may have the provision that each of the broken corner edges comprise at least one of a chamfer or a fillet, preferably with each of the broken corner edges comprising between 10% to 50% of a thickness of the bit body at the cutting face between opposed first and second side faces.

The broken corner edges are preferably formed by machining (e.g. milling) but may also be formed otherwise.

The at least one broken corner edge of the bit body may comprise both a first broken corner edge joining the peripheral border edge with the first side face and a second broken corner edge joining the peripheral border edge to the second side face, with the peripheral border edge including an intermediate connecting portion intermediate of the first broken corner edge and the second broken corner edge.

A main cutting section may be arranged adjacent to the at least one cutter tooth along the cutting face, with the main cutting section spanning a width that is at least three times that of the at least one cutter tooth.

Such main cutting section may be centrally located along a longitudinal axis of the bit body.

Preferably, the at least one cutter tooth comprises a plurality of cutter teeth.

When multiple cutter teeth and a main cutting section are provided, there may be at least one cutter tooth on opposed sides of the main cutting section, with the cutting face extending along the plurality of cutter teeth and along the main cutting section.

A first notch can be located between the at least one cutter tooth and the main cutting section, and a second notch can located between the cutter tooth and a side edge of the bit body.

At least cutter tooth can define at least one reduction in thickness region at a periphery relative to a central connecting region of the bit body for the at least one cutter tooth, with the at least one reduction in thickness region being coated with hard face coating.

Each at least one cutter tooth may comprises a base block body connecting to the tooth to a remainder of the engaging region and a tapered tip extending from the base block body. The tapered tip can include converging tapering sides along the cutting face joining at point.

A main cutting section may be arranged adjacent to the at least one cutter tooth, with the main cutting section preferably comprising a trapezoidal shape having converging sides joining along the cutting surface at an extended blunt surface.

At least one cutter tooth can be integrally cut or formed into the bit body such as by machining or stamping. Machining may involve conventional machining (e.g. milling) or non-conventional machining (e.g. laser removal).

The bit body may comprise opposed first and second side faces and a peripheral border edge extending transversely between the opposed first and second side faces. Further, carbide insert buttons may be embedded in the peripheral border edge spaced from and intermediate between the opposed first and second side faces.

Preferably, a hard face coating is applied to an outer periphery of the bit body, which outer periphery may include the at least one cutter tooth.

The hard face coating may be applied entirely to the outer periphery of the bit body or at 35%; and more typically least 50% of the outer periphery such as in higher wear regions proximate the leading thrust face and/or cutting face. Other regions such as top and bottom side faces may be partially hard face coated and/or free of hard face coating.

The hard face coating may comprise a hardness of 1000 to 2500 of Vickers Hardness. Preferably, the hard face coating consists of a laser applied coating. The hard face coating may comprise a matrix material of between 40% and 70% nickel by weight and a hard-constituent material of between 30% and 80% tungsten by weight.

In one embodiment, the horizontal directional drilling (HDD) bit is flat bit.

For example, the bit body of the flat bit may have a length (L) extending between a base edge of the mounting region to the cutting face of the engaging region; a width (W) extending between opposed side edges, the side edges extending transversely between the base edge and the cutting face, and a thickness (H) defined between a opposed side faces. The base edge, the cutting face and the side edges may extend around a periphery of the opposed side faces transversely thereto, and for most flat bits define a ratio of the length (L) to thickness (H) in a first range from 5 and 18, and a ratio of the width (W) to thickness (H) in a second range from 2 to 6.

In a flat bit, the engaging may either be co-planar with the mounting region, or a bend may be defined between the mounting region and the engaging region, which bend may provide a bend angle between greater than 0 degrees and not greater than 20 degrees.

Preferably, a number and a size of the at least one cutter tooth are proportional to an overall size of the flat bit, with the number being defined by thickness (H) multiplied by width (W) and divided by a factor of between 0.5 and 2.

In another embodiment, the horizontal directional drilling (HDD) bit comprises an annular shaped cobble bit.

Preferably, the hard face coating covering the at least one broken edge forms at least part of the cutting face.

For example, the hard face coating covering the at least one broken edge may be applied to at least a leading thrust edge and a leading rotational edge of the bit body.

Preferably, the hard face coating covering the at least one broken edge extends over at least about 25% of an outer periphery of the bit body from the leading thrust edge and along the peripheral border edge.

The hard face coating covering the at least one broken edge may extend at least over a pivot region away from the cutting face along at least one of a wrist region and a belly region of the bit body.

Preferably, the hard face coating comprises laser cladding deposited upon and integrally bonded into the metal material of the bit body. The laser cladding can be applied to the at least one broken corner edge and can at least partially cover adjacent regions on opposed sides of the at least one broken corner edge. However, top and bottom side surfaces of the bit body may be partly free of the laser cladding to provide exposed surface of the metal material in regions spaced from the at least one broken corner edge.

Each broken corner edge may comprise at least one of a chamfer or a fillet. Preferably, each of the broken corner edges comprises between 10% to 50% of a thickness of the bit body at the cutting face between opposed first and second side faces.

The apparatus may further comprises carbide insert buttons embedded in the peripheral border edge spaced from and intermediate between the opposed first and second side faces.

Preferably, the hard face coating comprising a hardness of 1000 to 2500 of Vickers Hardness, which may be laser cladding, or other hard face coating such as weld-on cladding such as PTA welding (or may be other surface-treatment process that fuses or sprays on a deposit or coating of additive materials that are harder than the base steel material). A hard face coating is an additive process that adds material to the steel material and increases the weight and thickness of the part.

Preferably, the hard face coating consists of at least one of a laser applied coating (e.g. melting of the steel material to deposit particles of harder material and provide an additive process), a tungsten carbide and a nickel matrix.

Preferably, the hard face coating comprises a matrix material of between 40% and 70% nickel by weight and a hard-constituent material of between 30% and 80% tungsten by weight.

The bit body along with the hard face coating may also be heat treated, the metal material being steel and having a heat treated hardness of between 35 and 65 HRC. Heat treatment is not an additive process but adds additional integrity and wear resistance to the steel base material and/or the hard face coating.

A method is also providing for making a horizontal directional drilling (HDD) bit, comprising: providing a bit body; machining or forming a corner region on the bit body to provide the at least one broken corner edge; and thereafter cladding over the at least one broken corner edge.

The method may further comprise machining or forming a plurality of cutter teeth into the bit body prior to the cladding, wherein said cladding comprises cladding over the cutter teeth.

Preferably, the cladding comprises laser cladding that partially melts the bit body and deposits a clad matrix into a melted region of the bit body.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 7:
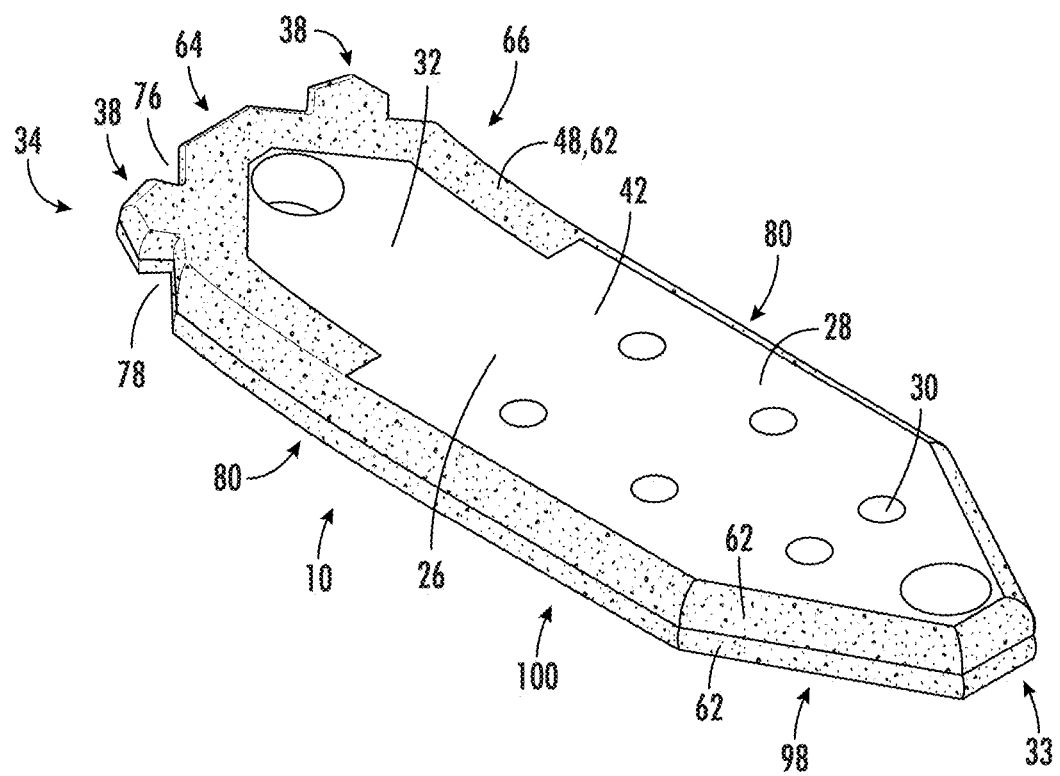
FIG. 7 is a perspective view of the flat bit shown in FIG. 4 but additionally with laser cladding beads applied in select regions to provide a hard face coating.
Figure 8:
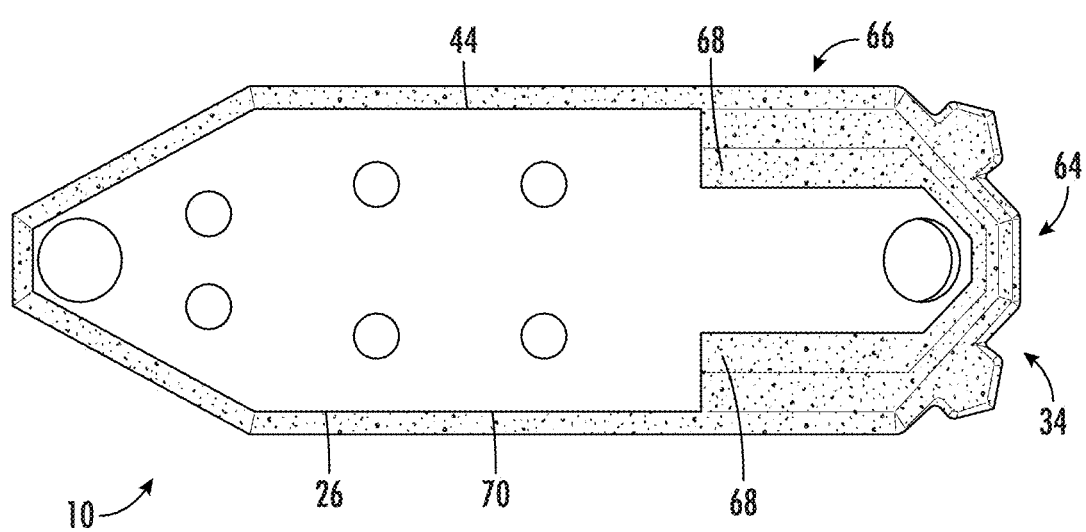
FIG. 8 is a bottom side face view of the flat bit shown in FIG. 7
Figure 9:
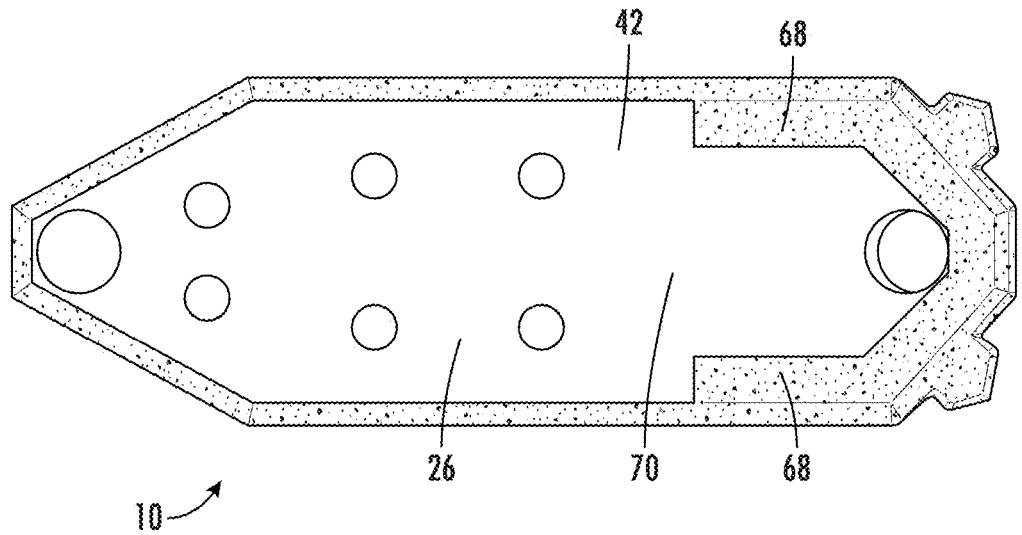
FIG. 9 is a top side face view of the flat bit shown in FIG. 7
Figure 10:
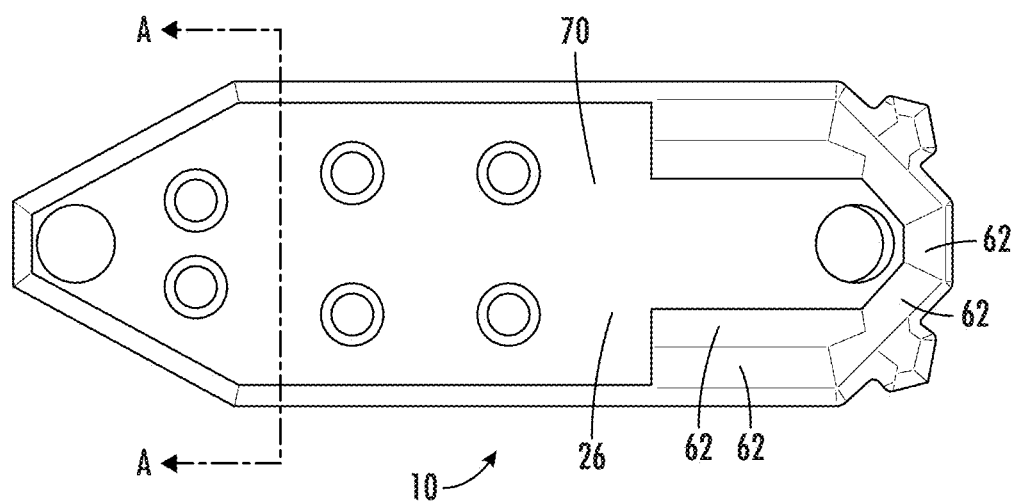
FIG. 10 is generally the same view of the flat bit as shown in FIG. 8, but with the laser cladding beads being shown schematically in line art.

Referring first to FIG. 7, an embodiment of the present invention has been illustrated as an apparatus for boring holes that takes the form of and comprises a horizontal directional drilling (HDD) bit which in this embodiment is a flat bit 10 that includes an improved cutting face profile, which may include an integrally provided cutter tooth profile and/or a hard face coating applied along a broken edge.

Figure 1:
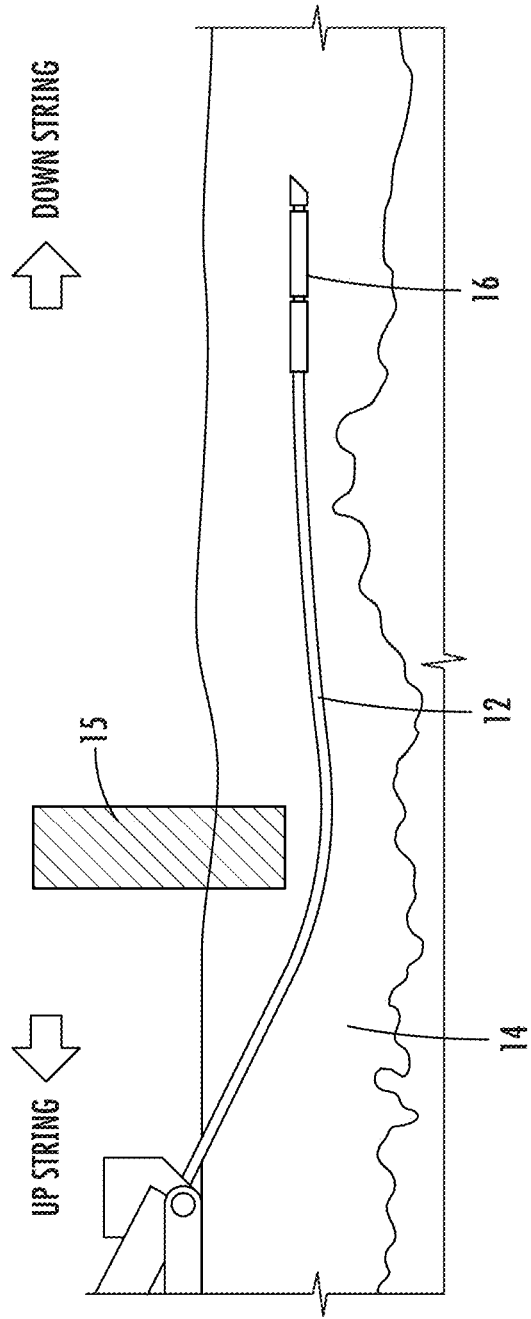
FIG. 1 is a schematic cross section and side elevation view of an HDD drill string assembly and horizontal drilling operation using a flat drill bit according to an embodiment of the invention.
Figure 2:
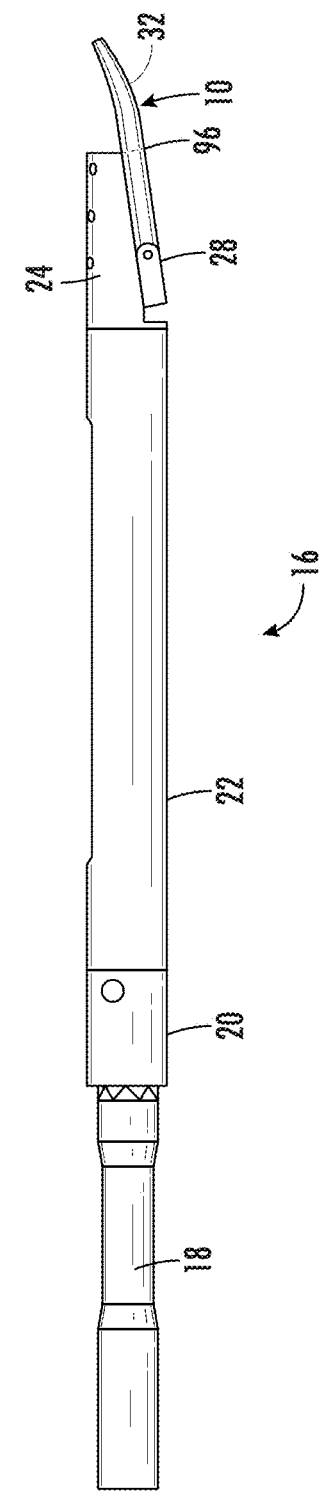
FIG. 2 is an enlarged side view of the HDD drill string assembly shown in FIG. 1.

Referring to FIGS. 1 and 2, the flat bit 10 is useable for drilling a horizontal bore 12 into a soil/earth substrate 14 which is remotely and directionally controlled so as to avoid obstacles such as a wall 15. More specifically, the flat bit 10 is a removable and replaceable part of a drill string assembly 16. Drill string assembly 16 comprises: a starter rod 18, a starter rod collar 20, a sonar housing 22, a housing/bit adapter 24, and the removable boring bit in the form of the flat bit 10. Each of these components may be referred to individually as a horizontal directional drilling (HDD) component" and/or a "drill string component, or similar. FIGS. 1 and 2 therefore show the environment in which the apparatus in the form of the flat bit 10 is useable.

Referring to FIGS. 7-11 (and with reference to FIG. 4 for details about the bit body by itself prior to cladding), the flat bit 10 comprises a bit body 26 of a metal material, which most typically is a steel material. The bit body 26 includes a mounting region 28 for mounting to the remainder of the drill string assembly 16 (shown in FIGS. 1-2), and for example defining at least one and typically several mounting apertures 30 that align with corresponding apertures on the bit adaptor 24 such that the flat bit 10 can be removable and replaceably mounted to the bit adaptor 24 via fasteners such as bolts (not shown).

Additionally, the flat bit also includes an engaging region 32 extending forwardly from the mounting region 30. Both are unitarily part of the same steel bit body 26 such that the engaging region is fixed relative to the mounting region. The engagement region 32 is referenced as such as it includes a cutting face 34 therealong that is generally the portion of the bit 10 that excavates soil and earthen material during rotation of the entire bit in the drill string assembly during operation.

The engagement region 32 may also include a hook point such as provided by hook point hole 36 (different than mounting apertures 30) that is open and free during operation that may be snagged by an operator to pull the drill string from the end bore location.

Figure 12:
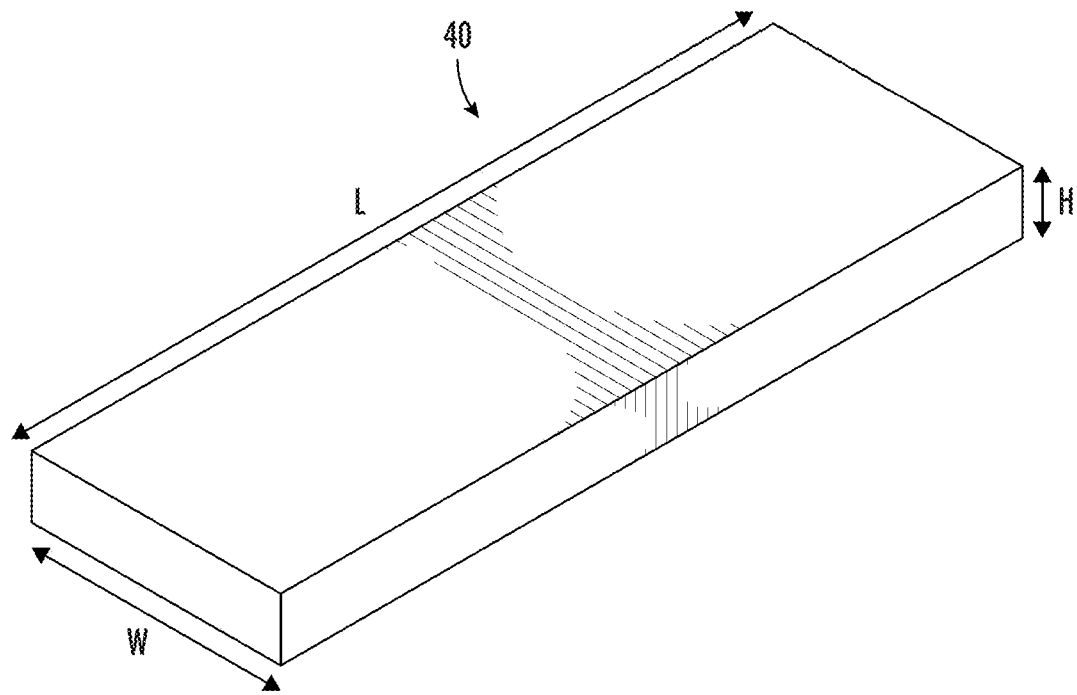
FIG. 12 is a flat bit blank that can be formed and/or machined into a flat bit of the other embodiments and is referenced for the geometry of length (L), height or thickness (H) and width (W)

In accordance with an aspect, the flat bit 10 includes a cutter tooth profile along the cutting face 34 provided by at least one and typically multiple cutter teeth 38. The cutter teeth 38 are integrally provided by the steel base material of the bit body 26 typically by being unitarily part of the steel blank 40 (FIG. 12) from which the bit body 26 is formed such as by stamping and machined with holes and other cutting face profiling features. The cutter teeth 38 are thereby integrally formed into the engaging region 32 providing a toothed profile to the cutting face 34.

Given further attention to the bit body configuration, the bit body 10 comprises opposed first and second side faces provided by a top side face 42 and a bottom side face 44. Additionally an outer periphery is provided by a peripheral border edge 46 extending transversely (for example perpendicularly) between the opposed top and bottom side faces 42, 44.

To provide the bit body 10 with increased wear resistance, the bit body 10 is subject to a hard facing treatment such that the flat bit 10 includes a hard face coating 48 comprising a hard face material harder than the base steel material.

In accordance with an aspect, the peripheral border edge 46 is joined to at least one and typically both of the top and bottom side faces 44, 46 through top and bottom broken corner edges 50, 52 defined in the bit body. Broken corner edges 50, 52 are considered to be part of the peripheral border edge 46 as a whole. These broken corner edges 50, 52 provided reduced thickness regions to provide for receipt of the hard face coating 48 that covers the broken corner edges 50, 52.

The broken corner edges 50, 52 may each be provided by a chamfer 54 as shown (or alternatively a fillet such as a bullnose type profile for example). The chamfer 54 can be formed and more typically machined such as by milling, laser removal or other such machining operations.

Considering the tooth profile reduces material of the steel base material, the hard face coating 48 at least partially covers the each cutter tooth 38 such as preferably entirely covering the cutter tooth 38. In this manner, a tooth profile may not need not be created by large carbide tooth inserts but be generated by the base steel material of the bit body 36 itself. The hard face coating 48 is of a hard face material harder than the metal material of the bit body to provide increased wear resistance.

Figure 3:
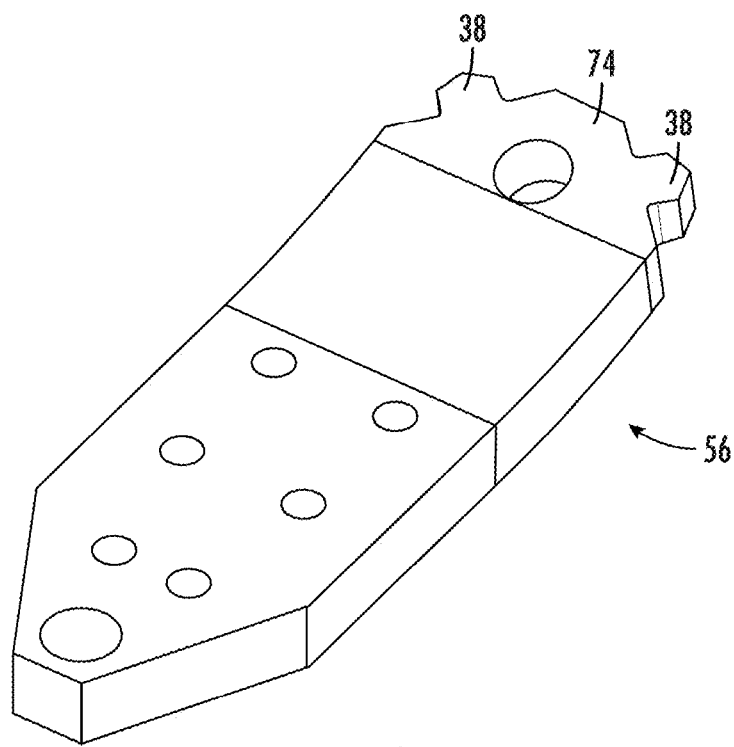
FIG. 3 is a perspective view of a flat drill bit with a machined tooth profile according to a first embodiment of the present invention.
Figure 4:
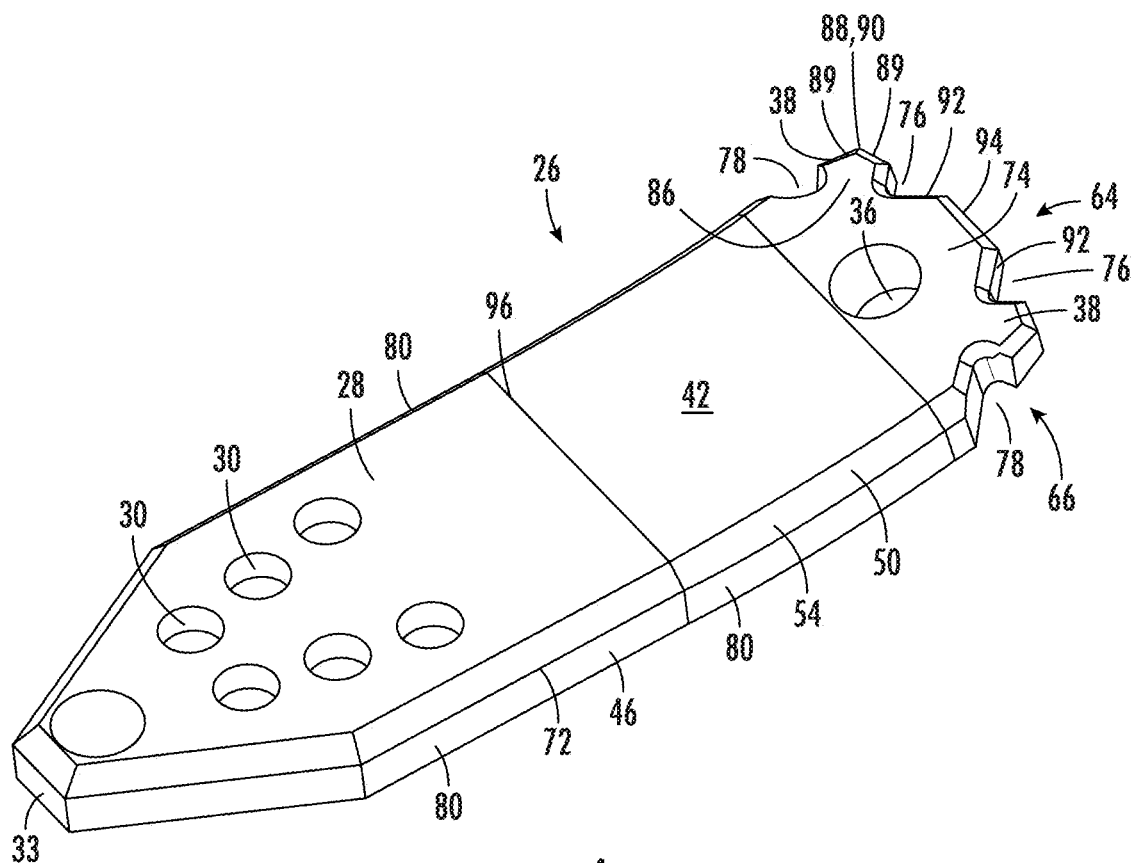
FIG. 4 is a perspective view of the flat bit embodiment of FIG. 3, but with an additional broken edge profile that is configured to receive a hard face coating.
Figure 5:
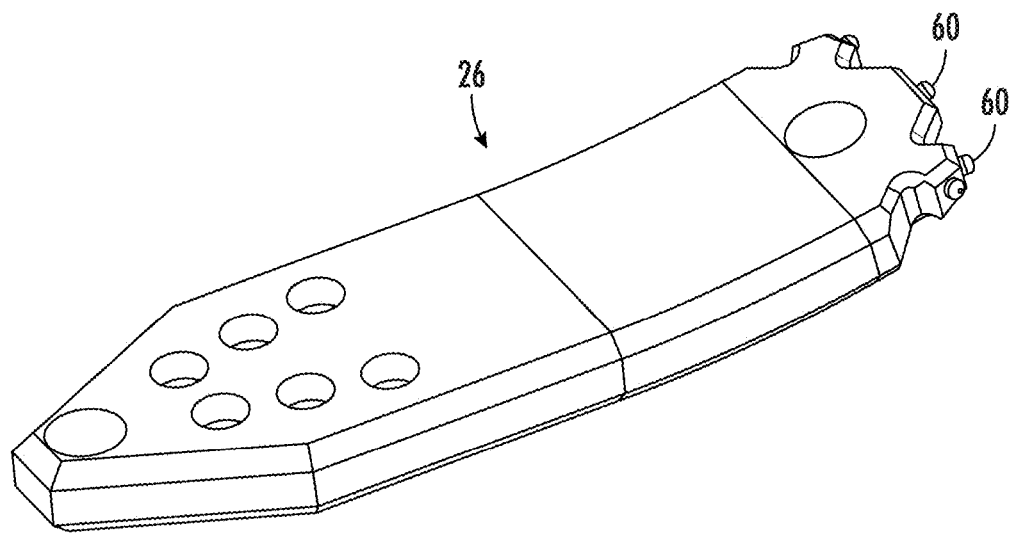
FIG. 5 is a perspective view of the flat bit embodiment of FIG. 4 but additionally with preformed carbide button inserts added.

To provide this profiling, the rectangular steel blank 40 (FIG. 12) can first be cut into the tooth profiled bit 56 shown in FIG. 3, and can then be further refined such as with machining to include chamfers or fillets to the bit body 26 ready for receipt of hard facing shown in FIG. 4 (and FIG. 5 with additional carbide button inserts). For reference and for purposes of range dimension range limitations, the dimensions of the bit body including width (W), length (L) and thickness (H) (thickness also be referred to as height) are indicated on the blank shown in FIG. 12, which is the same size as the bit body other than notches removed for profiling the cutter teeth and/or mounting region, and an optional bend that may be used in many flat bit configurations. However, the dimensions W, L, H while applicable to other figures are shown only on FIG. 12.

For example, the bit body 26 shown through FIGS. 3-10 of the flat bit 10 has a length (L) extending between a base edge 33 of the mounting region to the cutting face 34 of the engaging region 32 (e.g. the leading thrust edge region 66); a width (W) extending between opposed side edges 80 (the side edges extending transversely between the base edge 33 and the cutting face 34) and a thickness (H) defined between a opposed top and bottom side faces 42, 44. Herein, the base edge 33, the cutting face 34 and the side edges 80 extend around a periphery of the opposed top and bottom side faces 42, 44 transversely thereto. For typical flat bit design, preferably a ratio of the length (L) to thickness (H) is in a first range from 5 and 18, and a ratio of the width (W) to thickness (H) is in a second range from 2 to 6.

A chamfering (and/or filleting) operation such as by machining or forming may be used to create the top and/or bottom broken edges 50, 52, as shown in FIG. 4. Preferably, the top and/or bottom broken edges 50, 52 also traverse cutter teeth 38.

Figure 6:
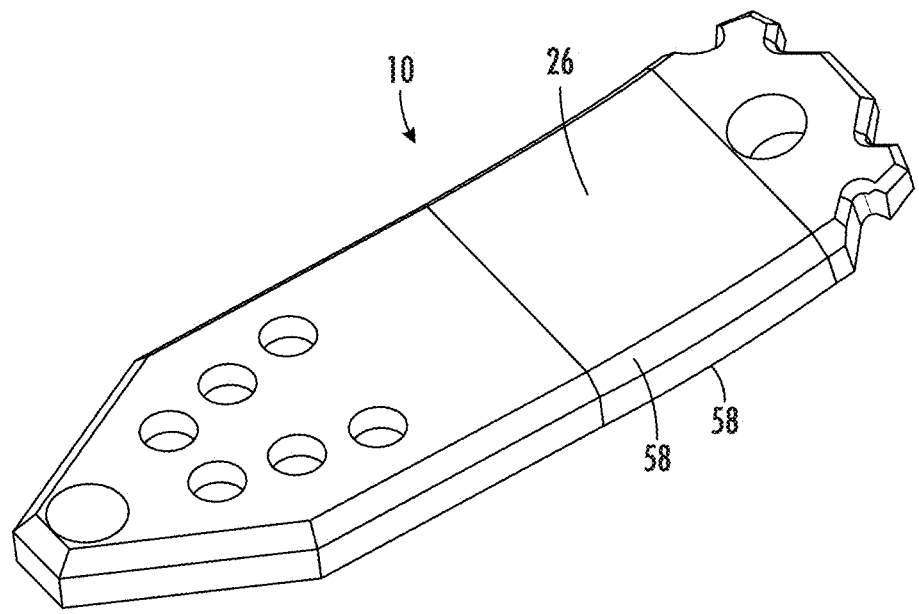
FIG. 6 is a partly schematic perspective view of the flat bit embodiment of FIG. 4 (also applicable to FIG. 5), that shows schematic application target regions for laser cladding (e.g. cladding application regions 58) to indicate a hard face coating.
Figure 11:
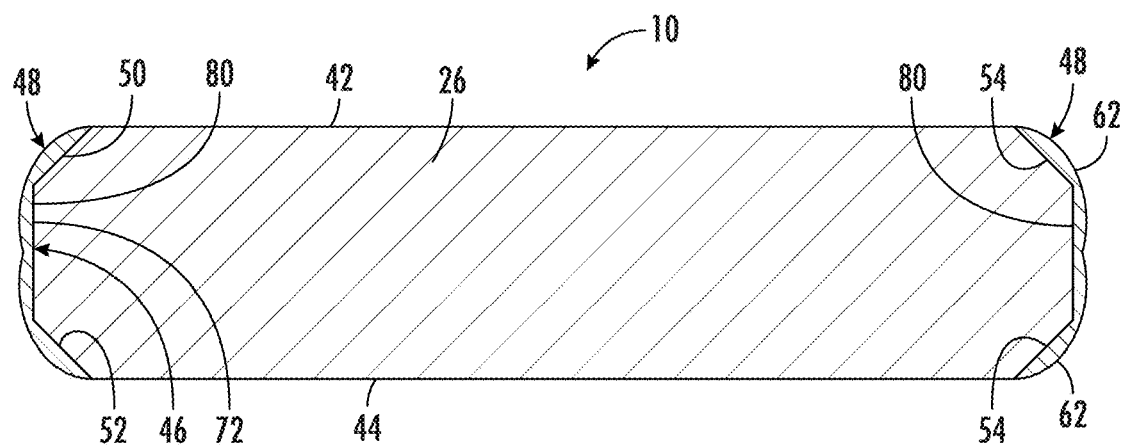
FIG. 11 is a cross section of FIG. 10 taken about line A-A to show the cladding along the peripheral edge and top and bottom broken edges (e.g. chamfers), with two partially overlapping beads being applied as shown in partly schematic form, one along each broken edge (e.g. chamfer)

As shown in FIG. 6, then hard facing can be applied which is preferably selective such as by clad beads which cladding application regions 58 are shown schematically in this figure, with the resulting hard face profile best seen in the cross-section of FIG. 11 (see also FIGS. 7-10). For example, clad beads may be deposited and integrally bonded to the steel base material of the bit body via laser cladding.

As shown in FIG. 5, optionally and before hard facing, carbide button inserts 60 may be first embedded such as via press fitting or otherwise into the steel base material of the body and into the regions of the cutter teeth 38 to provide additional wear resistance. Cladding after insertion of carbide button inserts 60 can also prevent erosion of steel material proximate the inserts 60 and prevent premature failure or loss of such inserts.

Preferably, the hard face coating comprises laser cladding such as laser clad beads 62 deposited upon and integrally bonded into the metal material of the bit body 26. As shown in the figures (see e.g. cross-section of FIG. 11) is applied to the broken corner edge(s) 50, 52.

The laser clad beads 62 may also at least partially covers adjacent regions on opposed sides of the at least one broken corner edge(s) 50, 52 as shown.

Additionally, laser clad beads 62 can be deposited and integrally bonded to the steel base material upon select regions of the top and bottom side faces 42, 44, such as along the cutting face to include proximate the leading thrust edge region 64 and/or leading rotational edge region 66.

For example, as shown in FIGS. 7-10, the top and bottom side faces 42, 44 (also referenced as top and bottom side surfaces herein) of the bit body 26 include a cladded region 68 with laser cladding and a free region 70 that is free of the laser cladding to provide exposed surface of the steel metal material in regions spaced from the broken corner edge(s) 50, 52. As apparent from the illustrations, the free region 70 is larger in area than the cladded region 68, typically at least twice as large in area as not all regions are subject to high wear.

While the top and bottom corner edges 50, 52 may connect, preferably the peripheral border edge 46 also includes an intermediate connecting portion 72 intermediate of the top and bottom broken corner edges 50, 52. This connecting portion 72 is also covered with hard face coating 48 such as the overlap of the clad beads 62 applied to the broken corner edges 50, 52 and/or an additional clad bead that could be applied directly toward the connecting portion 72.

The profile of the cutting face 34 may also comprise in addition to cutter teeth 38 a main cutting section 74 is adjacent to cutter teeth 38 along the cutting face, the main cutting section spanning a width that is at least three times that of the at least one cutter tooth.

The main cutting section 74 is centrally located along a longitudinal axis of the bit body 26, and at least one cutter tooth 38 is shown as being on opposed sides of the main cutting section 26. As illustrated, the cutting face 34 as a whole extends along the cutter teeth 38 and along the main cutting section 74.

With this tooth profile, interior notches 76 are cut into the bit body 26 closer to the longitudinal axis are between the cutter teeth 38 and the main cutting section 74, and exterior notches 78 are cut into the bit body 26 between the cutter teeth 38 and a side edge 80 of the bit body, the side edge being part of the outer periphery and peripheral border edge.

The material removed such as to create chamfers 54 provide a reduction in thickness region at a cutter tooth periphery relative to a central connecting region of the bit body for the cutter teeth. As noted about this reduction in thickness region is coated with hard face coating and the reduction in thickness provides room for additional buildup of hard face material as well as non-sharp bonding of the hard face material.

Each cutter tooth 38 can comprise a base block body 86 connecting to the tooth to a remainder of the engaging region 32 and a tapered tip 88 extending from the base block body 86, which tapered tip 88 includes converging tapering sides 89 also along the cutting face 34 joining at a point 90 (i.e. crest edge).

The main cutting section 74 can comprise a trapezoidal shape having converging sides 92 joining along the cutting surface at an extended blunt surface 94.

As noted above, the hard face coating 48 is applied to an outer periphery of the bit body (e.g. along the peripheral border edge 46) and preferably the entire outer periphery as shown. To provide desired wear resistance, the hard face coating comprising a hardness of 1000 to 2500 of Vickers Hardness. For example, the hard face coating may consist of a laser applied coating. The hard face coating can comprise a matrix material of between 40% and 70% nickel by weight and a hard-constituent material of between 30% and 80% tungsten by weight.

The hard face coating (which may also be used in laser clad bead) may include particles of at least one of the following materials: tungsten carbide, titanium carbide, iron carbide, diamond, ceramic, and other material having a Vickers scale hardness between HV 1200-2500

Optionally, a bend 96 is provided, however that is not considered to change the thickness (H) of the bit body as the thickness (H) is considered the material thickness. Otherwise, in some flat bit designs, the engaging region 32 is co-planar with the mounting region 28. If a bend is provided a bend is defined between the mounting region and the engaging region providing a bend angle between greater than 0 degrees and not greater than 20 degrees.

The bit size may also affect the a number and a size of the cutter tooth(s) which can be proportional to an overall size of the flat bit, with the number of cutter tooth(s) being defined by thickness (H) multiplied by width (W) and divided by a factor of between 0.5 and 2.

Preferably, the hard face coating 48 and/or the broken edge(s) 50, 52 extend over at least about 25% of an outer periphery the bit body from the leading thrust edge region 64 and along the peripheral border edge 46. More preferably, the hard face coating covering the at least one broken edge extends around substantially all (i.e. 85% or more) of the bit body along the peripheral border edge thereof.

Preferably the hard face coating 48 and/or the broken edge(s) 50, 52 extend over at least pivot region away from the cutting face 34 along at least one of and typically both of a wrist region 98 and a belly region 100 of the bit body 26.

Each of the broken corner edges 50, 52 may take the form of at least one of a chamfer or a fillet, with each of the broken corner edges comprising between 10% to 50% of the thickness (H) (i.e. material thickness) of the bit body at the cutting face between the top and bottom side faces.

Further, the bit body 26 along with the hard face coating are preferably heat treated. If the metal material of the bit body 26 is steel it is heat treated to a hardness of between 35 and 65 HRC.

Figure 13:
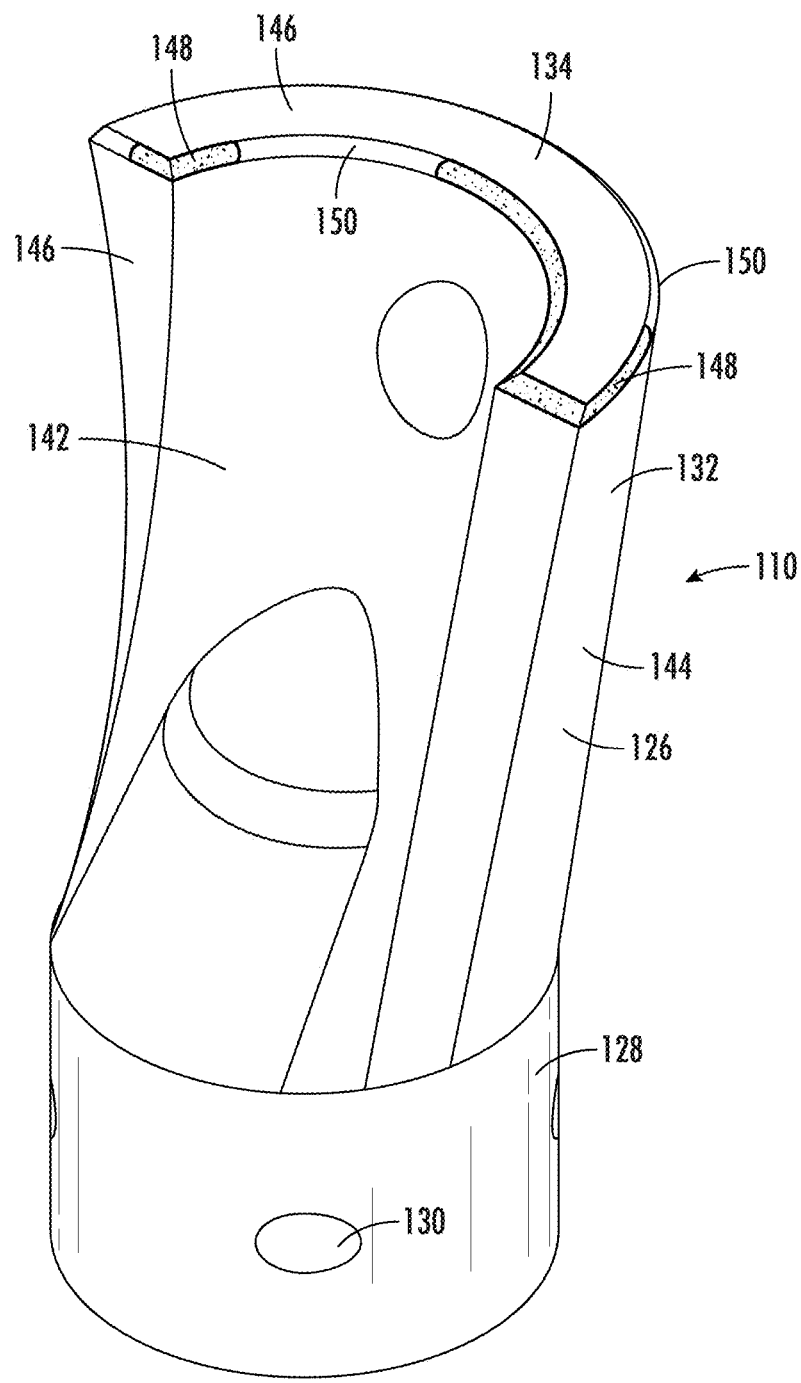
FIG. 13 is a perspective view of an HDD cobble bit according to another embodiment in which leading engagement edges are broken corner edges (e.g. chamfers) such as via machining for receipt of laser cladding, with only a portion of laser cladding schematically indicated along part of the broken corner edges for demonstrative purposes to show both cladding and the chamfer (it being understood that the remainder of the chamfer would be coated in a completed cobble bit).

While the embodiments of FIGS. 3-12 have been shown in conjunction with a flat bit design, the concepts such as the tooth profile and especially the broken edge for receipt of hard face coating (e.g. a laser clad bead) are also applicable to a cobble bit with an embodiment of a cobble bit 110 shown in FIG. 13 according to another embodiment. The description above as applied to the flat bit embodiment is also applicable to the cobble bit embodiment understanding the that shape of the bit is the primary difference with it being an annular (e.g. ring shape) rather than a flat shape.

In this embodiment, the cobble bit 110 includes an annular bit body 126 of a steel material, and also includes a mounting region 128 defining at least one mounting aperture 130, and an engaging region 132 extending forwardly from the mounting region 128 (similar to the flat bit embodiment the engaging region is fixed relative to the mounting region such that if the mounting region rotates the engagement region rotates therewith). The cutting face 134 (which may include teeth similar to those of the flat bit design that are not shown) are along the engaging region 132. Further the bit body comprises opposed first and second side faces which instead of being top and bottom are interior and exterior side faces 142, 144 that face radially inwardly and radially outwardly, respectively. And a peripheral border edge 146 extends transversely between the opposed side faces 142, 144. Further, as shown schematically in FIG. 13, a hard face coating 148 comprising a hard face material harder than the base material of the bit provide for increase wear resistance. Further the peripheral border edge 146 is joined to the side faces 142, 144 through broken corner edge(s) 150, 152 defined in the bit body 126, with the hard face coating 148 covering the at least one broken corner edge.

Other details of the hard face coating, broken edges and other details used from the earlier embodiment apply to the cobble bit of FIG. 13.

Considering that embodiments have been described additional observations, contemplated best design guidelines and further details of the new profile and features are expressed below, but not all configurations and combinations will be examined. The new profile aims to include machined cutter teeth on the leading edge and around the perimeter of the bit. Conventional methods of adding teeth to drill bits include adding carbide buttons or carbide banks. These styles of teeth are prone to chipping, breakage, and carbide loss due to the size, extreme hardness, and affixing methods of the solid carbide. In addition, the hard carbide material requires special attention if applying a hard face coating post fabrication, so eliminating this material will conserve time and money.

To supplant the current method, the size of the teeth are substantial enough to create conventionally higher localized pressures, but not so large they induce failure. For a typical 4"×1"×12" (W×T×L) flat bit, the number of machined teeth on the leading edge can range from two teeth, up to eight, or better expressed as the width of the bit W, divided by a range of 2 down to 0.5. This criterion will yield a bit with proportionally sized teeth based upon the thickness and width $$Teeth = (Thickness * Width)/(0.5-2)$$

In this equation, where 0.5 would yield a high tooth count, and 2 would yield a very low tooth count. The teeth will extend from the body of the bit and may be limited to a length of no more than the thickness of the bit.

The broken edge or chamfer applied to the periphery of the bit will also be expressed in terms of the width and thickness. A typical representation of this feature on a 4"×1" flat bit is a 0.25"×45° chamfer around both the top and bottom surfaces. As another example each chamfer may have a width (for a 1 inch flat bit) that is 0.2 inch (+0.05 inch variance).

In these and other examples, the broken corner edges typically comprise between 10% to 50% of a thickness of the bit body at the cutting face between opposed first and second side faces.

If two broken corner edges are at 50% of the bit body thickness, then the thickness of the peripheral border edge is consumed and provided by the broken corner edges, and the intermediate connecting portion 72 of peripheral border edge 46 may become effectively a pointed edge. If the broken corner edges are at 10% of the bit body thickness, then far less of the peripheral border edge is consumed and provided by the broken corner edges, with 80% of the thickness provided by the intermediate connecting portion 72.

The chamfer can be any type of broken edge applied at any point around the perimeter of a bit (e.g. may be a fillet). To maximize the elimination of the stress concentration factors posed by the sharp corners, the chamfer should be designed to consume about ¼ of the total thickness of the part. This way, when featuring the top and bottom of the bit, the total thickness consumed by the chamfer will be t/2. The angle of the chamfer ideally would be 45° but it is realized other geometries may limit this. Typical guidelines for the chamfer would be:

$$Chamfer = 45° \times (Thickness/4)$$

The hard face coating subsequently applied to the bit can also be achieved through various means. The intent of the hard face coating is to protect areas of the bit that see the most wear. Due to the pushing and rotating of the bit, high pressure regions of wear occur throughout the bit, primarily on the leading cutting edge (which may also be referred to as cutting face), wrist portion, and rearward heal pivot point. By coating these areas with hard facing, the high-pressure abrasion does not have a chance to affect the softer base material of the bit. Without this coating in those specific regions, the wear characteristics of a bit will render it less desirable in an aggressive digging situation.

The broken edges around the periphery in conjunction with the hard face coating further help to reduce abrasion and wearing. Additionally, the broken edges present beneath the hard face coating serve to eliminate the softer base material from yielding under extremely high load environments. The high stress concentration of the corner geometry is conventionally the first place the parent material will yield. By eliminating the sharp corner, and subsequently applying the hard face coating completely over the new geometry, the high load deformation of the parent material is less likely to happen, therefore prolonging the wear of the bit.

Although readily evident from the context used herein, for further clarity, where "at least one of" is followed by a grouping of items such as a, b, and c, the phrase encompasses the broad interpretation, and in particular either: a, b, or c; or any combination of a, b and c (e.g. a and b; b and c; a and c; or a, b and c). For example, as used herein at least one of the first and second side faces encompasses: the first side face, the second side face, or both of the first and second side faces. Similarly "at least one of a chamfer or a fillet" encompasses: a fillet, a chamfer, or both a chamfer and a fillet.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for boring holes, comprising:
a horizontal directional drilling (HDD) bit comprising a bit body of a metal material, the bit body including a mounting region defining at least one mounting aperture, and an engaging region extending forwardly from the mounting region, the engaging region being fixed relative to the mounting region, the horizontal directional drilling (HDD) bit including a cutting face along the engaging region, and wherein at least one cutter tooth of the metal material is integrally formed into the engaging region providing a toothed profile to the cutting face;
wherein a hard face coating at least partially covers the at least one cutter tooth, the hard face coating being of a hard face material harder than the metal material of the bit body to provide increase wear resistance; and
wherein the bit body comprises opposed first and second side faces and a peripheral border edge extending transversely between the opposed first and second side faces, the peripheral border edge being joined to at least one of the first and second side faces through at least one broken corner edge that extends over the at least one cutter tooth and defined in the bit body, the hard face coating covering the at least one broken corner edge to form at least part of the cutting face, with each of the at least one broken corner edge comprising between 10% to 50% of a thickness of the bit body at the cutting face between opposed first and second side faces.

2. The apparatus of claim 1, wherein the hard face coating comprises laser cladding deposited upon and integrally bonded into the metal material of the bit body, wherein laser cladding is applied to the at least one broken corner edge and at least partially covers adjacent regions on opposed sides of the at least one broken corner edge, and wherein first and second side faces of the bit body include a cladded region with laser cladding and a free region that is free of the laser cladding to provide an exposed surface of the metal material in regions spaced from the at least one broken corner edge, wherein the free region of the first and second side faces is larger in area than the cladded region of the first and second side faces.

3. The apparatus of claim 1 wherein each of the at least one broken corner edge comprises at least one of a chamfer or a fillet.

4. The apparatus of claim 1, wherein the at least one broken corner edge comprises a first broken corner edge joining the peripheral border edge with the first side face and a second broken corner edge joining the peripheral border edge to the second side face, the peripheral border edge including an intermediate connecting portion intermediate of the first broken corner edge and the second broken corner edge.

5. The apparatus of claim 1, wherein the cutting face comprises a main cutting section, wherein the main cutting section is adjacent to the at least one cutter tooth along the cutting face, the main cutting section spanning a width that is at least three times that of the at least one cutter tooth.

6. The apparatus of claim 5, wherein the main cutting section is centrally located along a longitudinal axis of the bit body, and wherein the at least one cutter tooth comprises a plurality of cutter teeth, including at least one cutter tooth on opposed sides of the main cutting section, the cutting face extending along the plurality of cutter teeth and along the main cutting section.

7. The apparatus of claim 6, wherein a first notch is located between one of the cutter teeth and the main cutting section, and a second notch is located between said one of the cutter teeth and a side edge of the bit body.

8. The apparatus of claim 1, wherein the at least one cutter tooth defines at least one reduction in thickness region at a periphery relative to a non-broken region of the bit body for the at least one cutter tooth, with the at least one reduction in thickness region being coated with hard face coating.

9. The apparatus of claim 1, wherein each at least one cutter tooth comprises a base block body connecting to a remainder of the engaging region and a tapered tip extending from the base block body, the tapered tip including converging tapering sides along the cutting face joining at point.

10. The apparatus of claim 9, wherein the cutting face comprises a main cutting section adjacent to the at least one cutter tooth, the main cutting section comprising a trapezoidal shape having converging sides joining at an extended blunt surface.

11. The apparatus of claim 1, wherein the at least one cutter tooth is integrally formed into the bit body by at least one of machining or stamping.

12. The apparatus of claim 1, wherein the bit body comprises opposed first and second side faces and a peripheral border edge extending transversely between the opposed first and second side faces, further comprising carbide insert buttons embedded in the peripheral border edge spaced from and intermediate between the opposed first and second side faces.

13. The apparatus of claim 1, wherein the hard face coating comprising a hardness of 1000 to 2500 of Vickers Hardness, the hard face coating consisting of a laser applied coating, wherein the hard face coating comprises a matrix material of between 40% and 70% nickel by weight and a hard-constituent material of between 30% and 80% tungsten by weight.

14. The apparatus of claim 1, wherein the horizontal directional drilling (HDD) bit is a flat bit.

15. The apparatus of claim 1, wherein the horizontal directional drilling (HDD) bit comprises an annular shaped cobble bit.

16. An apparatus for boring holes, comprising:
a horizontal directional drilling (HDD) bit comprising a bit body of a metal material, the bit body including a mounting region defining at least one mounting aperture, and an engaging region extending forwardly from the mounting region, the engaging region being fixed relative to the mounting region, the horizontal directional drilling (HDD) bit including a cutting face along the engaging region, and wherein at least one cutter tooth of the metal material is integrally formed into the engaging region providing a toothed profile to the cutting face;
wherein the horizontal directional drilling (HDD) bit is a flat bit; and
wherein the bit body of the flat bit has a length (L) extending between a base edge of the mounting region to the cutting face of the engaging region; a width (W)

extending between opposed side edges, the side edges extending transversely between the base edge and the cutting face, and a thickness (H) defined between opposed side faces, wherein the base edge, the cutting face and the side edges extend around a periphery of the opposed side faces transversely thereto, and wherein a ratio of the length (L) to thickness (H) is in a first range from 5 and 18, and wherein a ratio of the width (W) to thickness (H) is in a second range from 2 to 6.

17. The apparatus of claim 16, wherein the engaging region is co-planar with the mounting region, or a bend is defined between the mounting region and the engaging region providing a bend angle between greater than 0 degrees and not greater than 20 degrees.

18. The apparatus of claim 16, wherein a number and a size of the at least one cutter tooth are proportional to an overall size of the flat bit, with the number being defined by thickness (H) multiplied by width (W) and divided by a factor of between 0.5 and 2.

19. An apparatus for boring holes, comprising:
a horizontal directional drilling (HDD) bit comprising a bit body of a metal material, the bit body including a mounting region defining at least one mounting aperture, and an engaging region extending forwardly from the mounting region, the engaging region being fixed relative to the mounting region, the horizontal directional drilling (HDD) bit including a cutting face along the engaging region, wherein the bit body comprises opposed first and second side faces and a peripheral border edge extending transversely between the opposed first and second side faces;
a hard face coating comprising a hard face material harder than the metal material of the bit body to provide for increase wear resistance; and
wherein the peripheral border edge is joined to at least one of the first and second side faces through at least one broken corner edge defined in the bit body, the hard face coating covering the at least one broken corner edge, with each of the at least one broken corner edge comprising between 10% to 50% of a thickness of the bit body at the cutting face between opposed first and second side faces.

20. The apparatus of claim 19, wherein the hard face coating covering the at least one broken edge forms at least part of the cutting face.

21. The apparatus of claim 19, wherein the hard face coating covering the at least one broken edge is applied to at least a leading thrust edge and a leading rotational edge of the bit body, the leading thrust edge and the leading rotational edge being provided by the cutting face.

22. The apparatus of claim 21, wherein the hard face coating covering the at least one broken edge extends over at least about 25% of the bit body along the peripheral border edge thereof.

23. The apparatus of claim 19, wherein the hard face coating covering the at least one broken corner edge extends at least over a bend away from the cutting face between the mounting region and the engaging region.

24. The apparatus of claim 19, wherein the hard face coating comprises laser cladding deposited upon and integrally bonded into the metal material of the bit body, wherein laser cladding is applied to the at least one broken corner edge and at least partially covers adjacent regions on opposed sides of the at least one broken corner edge, and wherein the first and second side faces of the bit body are at least partly free of the laser cladding to provide an exposed surface of the metal material in regions spaced from the at least one broken corner edge.

25. The apparatus of claim 19 wherein each of the at least one broken corner edge comprises at least one of a chamfer or a fillet.

26. The apparatus of claim 19, wherein the bit is a flat bit, and the at least one broken corner edge comprises a first broken corner edge joining the peripheral border edge with the first side face and a second broken corner edge joining the peripheral border edge to the second side face, the peripheral border edge including an intermediate connecting portion intermediate of the first broken corner edge and the second broken corner edge.

27. The apparatus of claim 19, further comprising carbide insert buttons embedded in the peripheral border edge spaced from and intermediate between the opposed first and second side faces.

28. The apparatus of claim 19, wherein the hard face coating comprising a hardness of 1000 to 2500 of Vickers Hardness.

29. The apparatus of claim 19, wherein the hard face coating consists of at least one of a laser applied coating, a tungsten carbide and a nickel matrix.

30. The apparatus of claim 19, wherein the hard face coating comprises a matrix material of between 40% and 70% nickel by weight and a hard-constituent material of between 30% and 80% tungsten by weight.

31. The apparatus of claim 19, wherein the bit body along with the hard face coating are heat treated, the metal material being steel and having a heat treated hardness of between 35 and 65 HRC.

32. The apparatus of claim 19, wherein the horizontal directional drilling (HDD) bit is flat bit.

33. The apparatus of claim 32, wherein the bit body of the flat bit has a length (L) extending between a base edge of the mounting region to the cutting face of the engaging region; a width (W) extending between opposed side edges, the side edges extending transversely between the base edge and the cutting face, and a thickness (H) defined between the opposed first and second side faces, wherein the base edge, the cutting face and the side edges extend around a periphery of the opposed side faces transversely thereto, and wherein a ratio of the length (L) to thickness (H) is in a first range from 5 and 18, and wherein a ratio of the width (W) to thickness (H) is a second range from 2 to 6, and wherein the engaging region is co-planar with the mounting region, or a bend is defined between the mounting region and the engaging region providing a bend angle between greater than 0 degrees and not greater than 20 degrees.

34. The apparatus of claim 19, wherein the horizontal directional drilling (HDD) bit comprises an annular shaped cobble bit.

35. The apparatus of claim 19, wherein the hard face coating fully covers the at least one broken corner edge along a region of the cutting face.

36. The apparatus of claim 19, wherein the cutting face includes a leading thrust edge at a front of the engaging region, and wherein the at least one broken corner edge comprises two broken corner edges, each of the two broken corner edges traversing entirely across the leading thrust edge from a right hand side of the bit body to a left hand side of the bit body.

37. An apparatus for boring holes, comprising:
a horizontal directional drilling (HDD) bit comprising a bit body of a metal material, the bit body including a mounting region defining at least one mounting aperture, and an engaging region extending forwardly from the mounting region, the engaging region being fixed relative to the mounting region, the horizontal directional drilling (HDD) bit including a cutting face along the engaging region, wherein the bit body comprises opposed first and second side faces and a peripheral border edge extending transversely between the opposed first and second side faces;

a hard face coating comprising a hard face material harder than the metal material of the bit body to provide for increase wear resistance;

wherein the peripheral border edge is joined to at least one of the first and second side faces through at least one broken corner edge defined in the bit body, the hard face coating covering the at least one broken corner edge;

wherein the bit is a flat bit, and the at least one broken corner edge comprises a first broken corner edge joining the peripheral border edge with the first side face and a second broken corner edge joining the peripheral border edge to the second side face, the peripheral border edge including an intermediate connecting portion intermediate of the first broken corner edge and the second broken corner edge; and wherein the hard face coating covering the at least one broken edge extends around substantially all of the bit body along the peripheral border edge thereof.

38. A method of making the apparatus of claim 19, comprising:

providing the bit body;

machining or forming a corner region on the bit body to provide the at least one broken corner edge; and thereafter cladding over the at least one broken corner edge.

39. The method of claim 38, further comprising machining or forming a plurality of cutter teeth into the bit body prior to the cladding, wherein said cladding comprises cladding over the cutter teeth.

40. The method of claim 38, wherein the cladding comprises laser cladding that partially melts the bit body and deposits a clad matrix into a melted region of the bit body.

* * * * *